United States Patent [19]
Nakamura et al.

[11] Patent Number: 5,986,723
[45] Date of Patent: Nov. 16, 1999

[54] LIQUID CRYSTAL DISPLAY WITH TFT CHANNEL AT GATE SOURCE CROSSING AND CAPACITOR DIVIDING PIXEL

[75] Inventors: Hiroki Nakamura; Yumi Kihara, both of Kanagawa-ken, Japan

[73] Assignee: Kabushiki Kaisha Toshiba, Kawasaki, Japan

[21] Appl. No.: 08/936,818

[22] Filed: Sep. 24, 1997

[30] Foreign Application Priority Data

Sep. 25, 1996 [JP] Japan .................................. 8-253080
Aug. 26, 1997 [JP] Japan .................................. 9-229807

[51] Int. Cl.⁶ .......................... G02F 1/136; G02F 1/1343
[52] U.S. Cl. .............................. 349/39; 349/43; 349/140
[58] Field of Search ................................ 349/38, 39, 43, 349/111, 140; 257/59, 72

[56] References Cited

U.S. PATENT DOCUMENTS 4,968,119  11/1990  Stewart ...................................... 349/46
5,483,366   1/1996  Atherton .................................... 349/42
5,721,601   2/1998  Yamaji et al. ........................... 349/138

OTHER PUBLICATIONS

N. Ichikawa, Asia Display '95, pp. 727–729, 1995, "Holographic Optical Element for Liquid Crystal Projector".

*Primary Examiner*—Kenneth Parker
*Attorney, Agent, or Firm*—Oblon, Spivak, McClelland, Maier & Neustadt, P.C.

[57] ABSTRACT

Signal lines are formed to cover semiconductor layers around gate electrodes of pixel switching elements thereby to shield the switching elements. The semiconductor layers connected to drain electrodes of the switching elements extend under the signal lines. Storage capacitor lines also extend along the signal lines. Storage capacitors are defined between the semiconductor layers and the storage capacitor lines. The storage capacitor lines divide the pixel electrodes into first and second regions, respectively. The first and regions are overlapped at least in part with the signal lines. Contacts between the semiconductor layers and the pixel electrodes are disposed apart from the gate electrodes.

15 Claims, 15 Drawing Sheets

LIQUID CRYSTAL DISPLAY WITH TFT CHANNEL AT GATE SOURCE CROSSING AND CAPACITOR DIVIDING PIXEL

BACKGROUND OF THE INVENTION

1. Field of the Invention

This invention relates to a liquid crystal display device and, more particularly, a polysilicon thin film transistor type liquid crystal display device in which driver circuits may be integrated.

2. Related Art

There have been many types of proposed and/or commercialized liquid crystal display devices. Most of them have a liquid crystal layer, the material of which is typically twisted nematic liquid crystal. In the liquid crystal display device of this sort, a display can be performed in response to changes in twist of liquid crystal molecules, i.e., those in optical rotary power of the liquid crystal layer. In more detail, its operation principle is to control light passing through the liquid crystal display panel and reaching to an observing side by making use of optical properties of the liquid crystal layer, i.e., its rotary power or birefringence and linear polarization.

This liquid crystal display panel includes thin film transistors (called "TFTs") which switch to supply voltages to the liquid crystal layer of the pixels. The TFTs in commercial use or developed ones are made of amorphous silicon or polysilicon as a semiconductor material. Since the polysilicon has higher mobility than the amorphous silicon, the polysilicon TFTs have advantages resulting from it. First, it is permissible to provide more electric charge per unit time to the TFTs. As a result, the size of TFT is made smaller so that the aperture ratio at a pixel of the liquid crystal display device increases. Second, driver circuits for TFTs of the liquid crystal display device can be formed on the same substrate as the TFTs. Physically separated driver integrated circuits (called "ICs") and assembling the same with the panel are, thus, unnecessary so that the manufacturing cost for the liquid crystal display device becomes less expensive. The polysilicon driver ICs for the TFTs can easily comply with such a requirement for the ICs as formed on quite narrow frame edge portions of the liquid crystal display panel. The polysilicon TFTs attract a great deal of attention as an important technology because of the advantages as set forth above.

The color projector, above all, is generally a three-plate type with three color panels for three primary red, green and blue colors (called "R, G and B colors") to attain high brightness. The color video camera monitor is, however, a one-plate (panel) type with a color filter. Further, some projectors with the one panel diverted from the camera monitor use have been commercialized for low brightness applications.

The one-plate type color liquid crystal display device with the color filter requires pixels three times as many as the three-plate type device so that the aperture ratio of the former becomes smaller than the latter. In addition, optical loss takes place with the color filter so that it is quite difficult to put the one-plate type projector with high brightness into practical use. The mainstream color projector, therefore, has been the three-plate type. The projector of this type needs three liquid crystal display panels and optical separation and synthesizing system, and it is quite difficult to commercialize a less expensive three-plate color projector.

From a view point of less expensive commercialization, several new one-plate types of projectors are widely noticed. Some projectors of this type, which have been actively developed, include a liquid crystal display panel provided with dichroic mirrors and a micro-lens array for color separation and direction changes, or hologram optical elements (called "HOE") with both color separation and focusing functions. The latter includes a light source, optical systems to lead parallel rays to the panel, and a projection lens in addition to the HOE, as major elements, so that its optical system is greatly simplified and it is expected to be of less expensive cost. The HOE will be briefly described hereinafter but N. Ichikawa, "Holographic Optical Element for Liquid crystal Projector", the proceedings of the Asia Display Society, pages 727 through 729, 1995, for instance, is a reference article for that technology.

FIG. 17 is a perspective schematic view of a liquid crystal display device with the HOE to explain its operation principle. For the sake of convenience, pixels for only one set of R, G and B colors in the display device are illustrated in the drawing. As shown, the HOE 102 is disposed on the incident light side of the display device 104 which includes a TFT array substrate 105 and a counter substrate 106 provided opposite thereto. The HOE 102 is provided for each set of pixels corresponding to the R, G and B colors in the liquid crystal display panel. Parallel white light 103 from a light source is incident to each HOE 102 at the incident angle of about 40°. The HOE 102 has diffraction and lens effects. Namely, the HOE 102 separates optical rays from the incident light, focalizes them on its focal plane, and forms a continuous spectrum distribution. Where the liquid crystal display panel 104 is properly disposed on the focal plane, color components are incident into the apertures 107, 108 and 109 of the pixels of R, G and B colors of the panel, respectively. In other words, the incident white light 103 on the HOE 102 is separated into the continuous spectrum but only components of the R, G and B colors 110, 111, and 112 pass through the apertures 107, 108, and 109 and become output light 115, 116, and 117. With this structure, the display device has advantages in that it performs a color display without any color filter and with no color filter loss and that its optical components are minimized in size and less expensive in cost.

A one-plate projector type liquid crystal display device using the HOE and the like needs pixels for R, G and B colors and the number thereof is three times that of pixels for a three-plate type one so that its definition must be much higher. In the case of the stripe-like color pixel arrangement shown in FIG. 17, the pixel length and breadth ratio is 3:1 and the lateral pitch is shorter. As a result, where its lay-out of a TFT and a storage capacitor in each pixel is the same as that of the conventional device with the ratio of 1:1, the TFT and the like remain disposed in an aperture of the pixel, and they are obstructions so that the aperture ratio decreases greatly. An explanation of this problem will be described in greater detail hereinbelow.

FIG. 18 is a plan view of a TFT array substrate used in a conventional liquid crystal display device with the pixel length and breadth ration is approximately 1:1. In the display device, a video signal provided to a signal line 134 is supplied to pixel electrodes 137A and 137B, respectively, through a source contact 133 of a TFT, gate portions 130A and 130B and pixel electrode contacts 140A and 140B. Selection of the gate portions 130A and 130B is controlled by scanning pulses supplied to scanning lines 139A and 139B. A storage capacitor 132 is defined between a storage capacitor line 135 and a polysilicon layer 131 to hold the video signal supplied to each pixel electrode.

The gate portion 130A and a part of the storage capacitor portion 132 are disposed under the signal line 134 and the storage capacitor line 135 is commonly provided between neighboring upper and lower pixels in the display device as shown in FIG. 16. 3 μm wiring rule applied to this layout achieves 40 μm pixel length with the aperture ratio of 36%. In this structure, however, drain contacts of the TFTs, i.e., pixel electrode contacts 140A and 140B are formed in the vicinity of the centers in the approximately rectangular apertures, respectively. If this structure is used for the rectangular, shorter width pitch pixels, the pixel electrodes protrude to the center portions of narrow apertures. The strongest intensity one of light components passing through each pixel is blocked if the display device of that structure is used in combination with the HOE and the micro-lens array.

As explained above, the incident white light on the HOE is separated, focalized, and, eventually, formed a continuous spectrum distribution on its focal plane. Each pixel for R, G or B color is desirably provided with a uniformly shaped aperture at a place corresponding to the R, G or B color spectrum distribution. In the case, however, that light blocking plates of the electrode contacts protrude to the pixel aperture as shown in FIG. 16 and set forth above, and a separation among pixels is insufficient, the pixel is difficult to receive effectively the pure R, G or B color light only and its color purity decreases. It is quite difficult to provide a high performance display panel by means of a conventional HOE one-plate type liquid crystal display device with the structure mentioned above.

Further, in the cases that a pixel is narrow and its width in the direction of a scanning line and a storage capacitor line is shorter than its length in the direction of a scanning line, and that it is necessary to make contact holes in source and drain portions of a device like a polysilicon TFT, it is more difficult to dispose TFTs within the pixel pitch in the lateral direction as the pixel definition becomes finer. It is also difficult to increase the capacitance value of the storage capacitor because the pixel pitch is small.

In addition, with the conventional structure shown in FIG. 18, since two neighboring scanning lines are disposed between the narrow pixels, short-circuit troubles take place easily. If the common storage capacitor line 135 as shown is not used, the storage capacitor line and the scanning line are provided in parallel with each other in a narrow space between the pixels and it also brings about short-circuit troubles between the. If the space is made large enough to avoid such problems, the aperture ratio becomes much poor.

SUMMARY OF THE INVENTION

According to one aspect of the present invention, a liquid crystal display device includes an array substrate, a counter substrate provided opposite to the array substrate, the counter substrate having counter electrodes, a liquid crystal contained between the array and counter substrates, scanning lines provided on the array substrate, signal lines running across the scanning lines through an insulator, switching elements including thin film transistors provided in a matrix-like form at crossing areas where the scanning lines run across the scanning lines, pixel electrodes provided in a matrix-like form in regions surrounded by the scanning and signal lines, the pixel electrodes being connected to the switching elements, and storage capacitor lines disposed in parallel with the scanning lines.

The storage capacitor lines divide the pixel electrodes into first and second regions and define storage capacitors overlapping with and extending along the signal lines. Each of the thin film transistors includes a semiconductor layer which is overlapped with and extended along the crossing area, an area adjacent thereto and the storage capacitor.

An end terminal of the semiconductor layer is overlapped with the first region of the pixel electrode. The semiconductor forms a channel at the crossing area. A first contact portion is defined between the signal line and one of the source and drain electrodes at a location in the vicinity of the channel. A second contact region is defined between the first region and another one of the source and drain electrodes at the end terminal of the semiconductor layer.

In the liquid crystal display device, the pixel electrode has a narrow configuration which longitude is in an extending direction of the signal line, the storage capacitor line divides the pixel electrode into two parts a long the extending direction, and the first region of the pixel electrode is smaller than the second region of the pixel electrode.

The first region of the pixel electrode is farther from the channel of the semiconductor than the second region of the pixel electrode. The scanning line, the storage capacitor line and the storage capacitor are formed with an identical pattern metal layer, while the semiconductor layer, the pattern metal layer, the signal line and the pixel electrode are laminated with each other through insulation layers including the insulator.

At least one of the scanning line, the signal line and the storage capacitor line is made of a light blocking material, and is overlapped with a periphery of the pixel electrode. The pixel electrode is made of laminated light blocking layers. The light blocking layer is formed on a first insulation layer different from a second insulation layer on which the pixel electrode is formed. The light blocking layer is further electrically connected to one of the source and drain electrodes and the pixel electrode.

An additional light blocking layer is formed on a peripheral edge portion enclosing a display area on one of the array and counter substrates. The additional light blocking layer is made of an electrically conductive material and is connected to a fixed potential. The additional light blocking layer is overlapped through the insulator with a driving circuit which drives at least one of the signal and scanning lines.

According to the another aspect of the invention, a liquid crystal display device also includes an array substrate, a counter substrate provided opposite to the array substrate, the counter substrate having counter electrodes, a liquid crystal contained between the array and counter substrates, scanning lines provided on the array substrate, signal lines running across the scanning lines through an insulator, switching elements including thin film transistors provided in a matrix-like form at crossing areas where the scanning lines run across the scanning lines, pixel electrodes provided in a matrix-like form in regions surrounded by the scanning and signal lines, the pixel electrodes being connected to the switching elements, storage capacitor lines disposed in parallel with the scanning lines, spacers provided on the array substrate to hold gaps between the array and counter substrates, and alignment layers provided on the inner surfaces of the array and counter substrates, the alignment layer being processed with rubbing.

The storage capacitor lines divide the pixel electrodes into first regions and second regions and define storage capacitors overlapping with and extending along the signal lines. Each of the thin film transistors includes a semiconductor layer which is overlapped with and extended along the crossing area, an area adjacent thereto and the storage capacitor. An end terminal of the semiconductor layer is overlapped with the first region of the pixel electrode. The semiconductor forms a channel at the crossing area. A first contact portion is defined between the signal line and one of the source and drain electrodes at a location in the vicinity of the channel. A second contact region is defined between the first region and another one of the source and drain electrodes at the end terminal of the semiconductor layer. The spacer is formed in a column-like configuration which cross-section is substantially narrow. The spacer is disposed at a location on the signal line adjacent to the first region of the pixel electrode.

A light blocking layer is formed on the counter substrate opposite to the first region of the pixel electrode. The cross-section of the spacer is shorter substantially in the direction of the rubbing than in other directions. A light blocking layer is further provided on the array substrate to shield improper liquid crystal alignment regions caused by the spacer. A light blocking layer is further provided on the counter substrate to shield improper liquid crystal alignment regions caused by the spacer.

DESCRIPTION OF THE PREFERRED EMBODIMENT

An active-matrix type liquid crystal display device of the present invention is provided with shielding of pixel switching elements by means of signal lines formed to cover an active layer in the periphery of gate electrodes of the pixel switching elements. Further, a drain region of the switching element extending under the signal line and a storage capacitor line define a storage capacitor through an insulation layer identical in material to a gate insulation layer of the switching element. The storage capacitor line is disposed to overlap with at least a part of pixel electrodes neighboring through the signal line, and a contact portion with the pixel electrode is provided between the storage capacitor line and the scanning line for the pixel located one row above. The pixel electrode is formed in a region on the substrate enclosed by the scanning line and the signal line. The pixel electrode has a pattern which is divided into two regions by the storage capacitor line disposed between the scanning lines and provided under the pixel electrode. The contact portion with the pixel is formed in one of the pixel electrode regions adjacent to the scanning line for the pixel located one row above on a plan view layout.

The plurality of the signal lines are disposed on a TFT array substrate in a stripe-like configuration. A plurality of the storage capacitor lines and the scanning lines are also provided on the TFT substrate in a stripe-like configuration. The liquid crystal display device of the invention can realize high aperture ratio pixels with the structure outlined above. The structure is particularly suitable for a one-plate type color liquid crystal display device with the pixel length and breadth ratio of 3:1. In short, the TFTs and storage capacitors are formed in the longitudinal direction and a contact portion with the pixel electrode in the second region of the TFT, e.g., the drain region is provided between the storage capacitor line and the scanning line for the one row above located pixel and in the center area of the upper section of its own pixel. As a result, the contact portion does not protrude into the aperture, a sufficient capacitance is obtained, and the space defined between the storage capacitor line and the scanning line is made wide.

Figure 1:
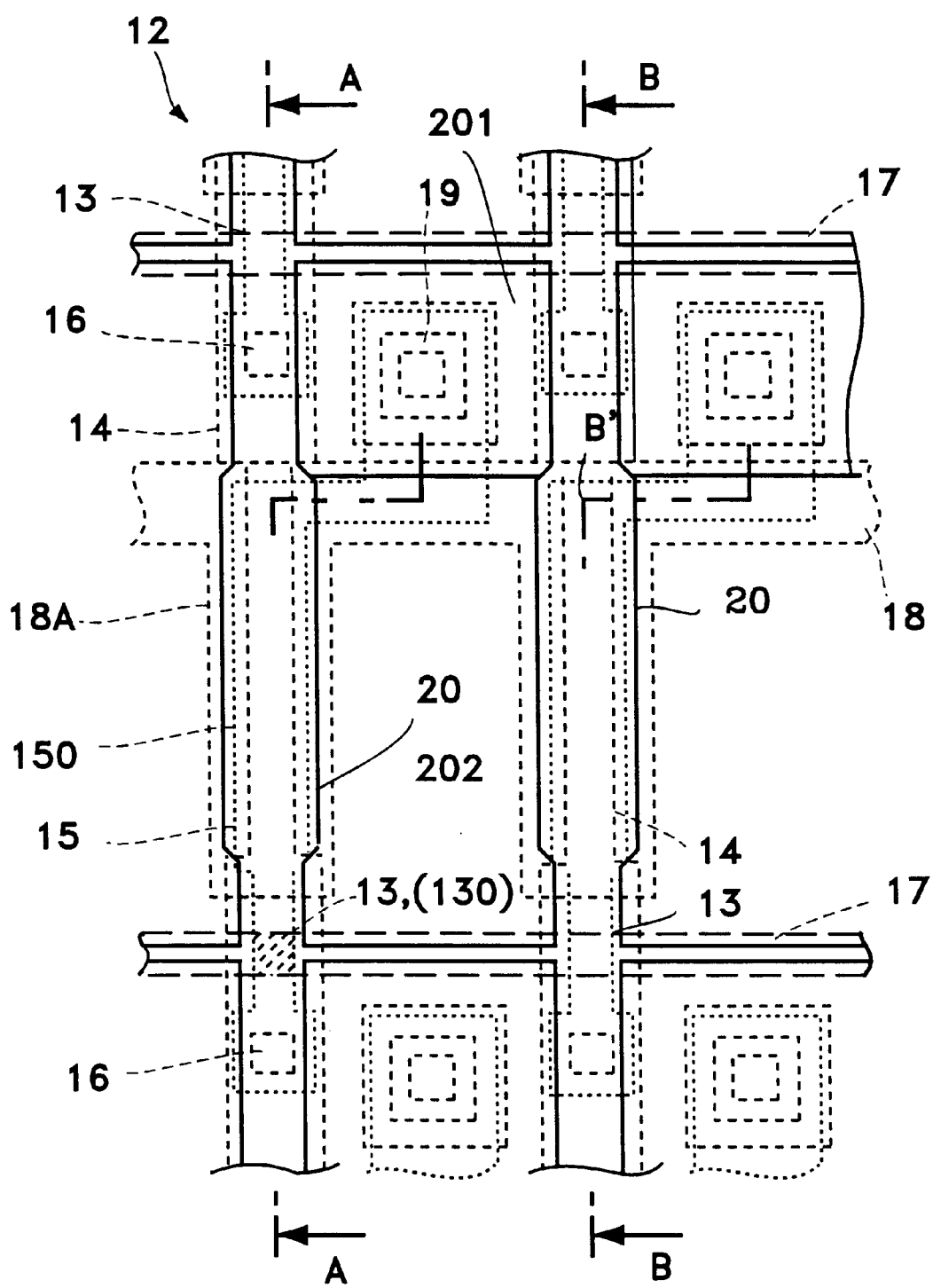
FIG. 1 is a schematic plan view of a liquid crystal display device of a first of the present invention.
Figure 2A:
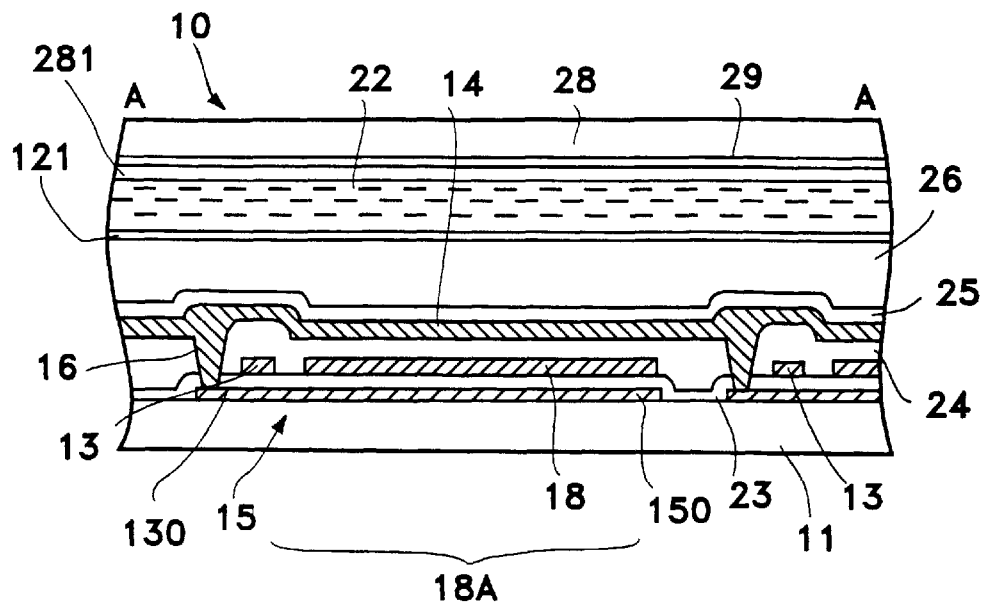
FIGS. 2(a) and 2(b) are cross-sectional views taken along A-A'-A and B-B'-B lines in FIG. 1, respectively.
Figure 2B:
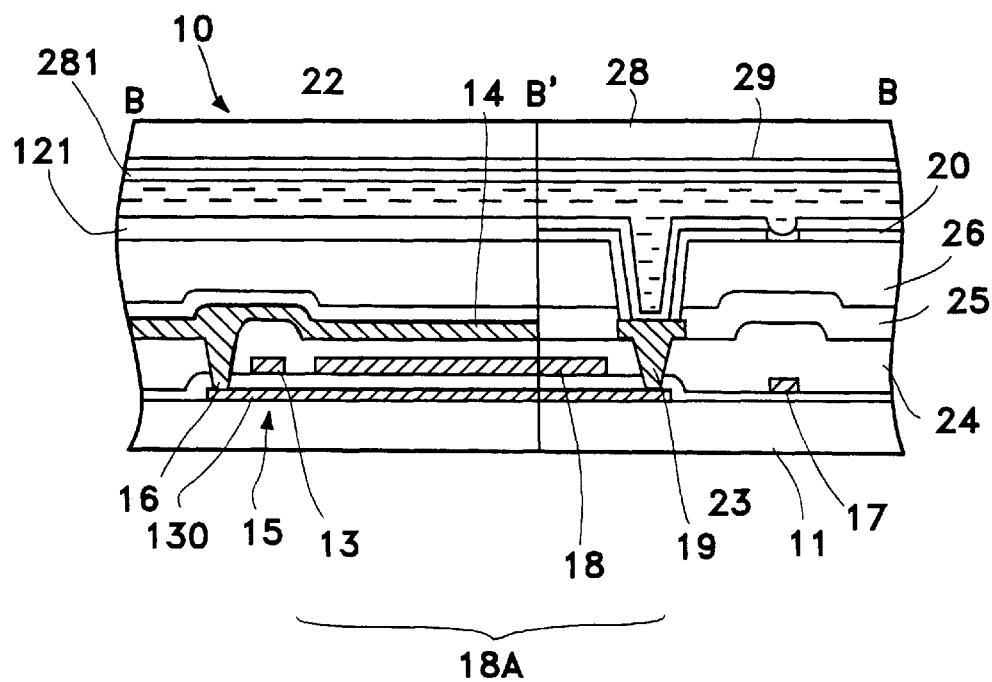
Figure 3:
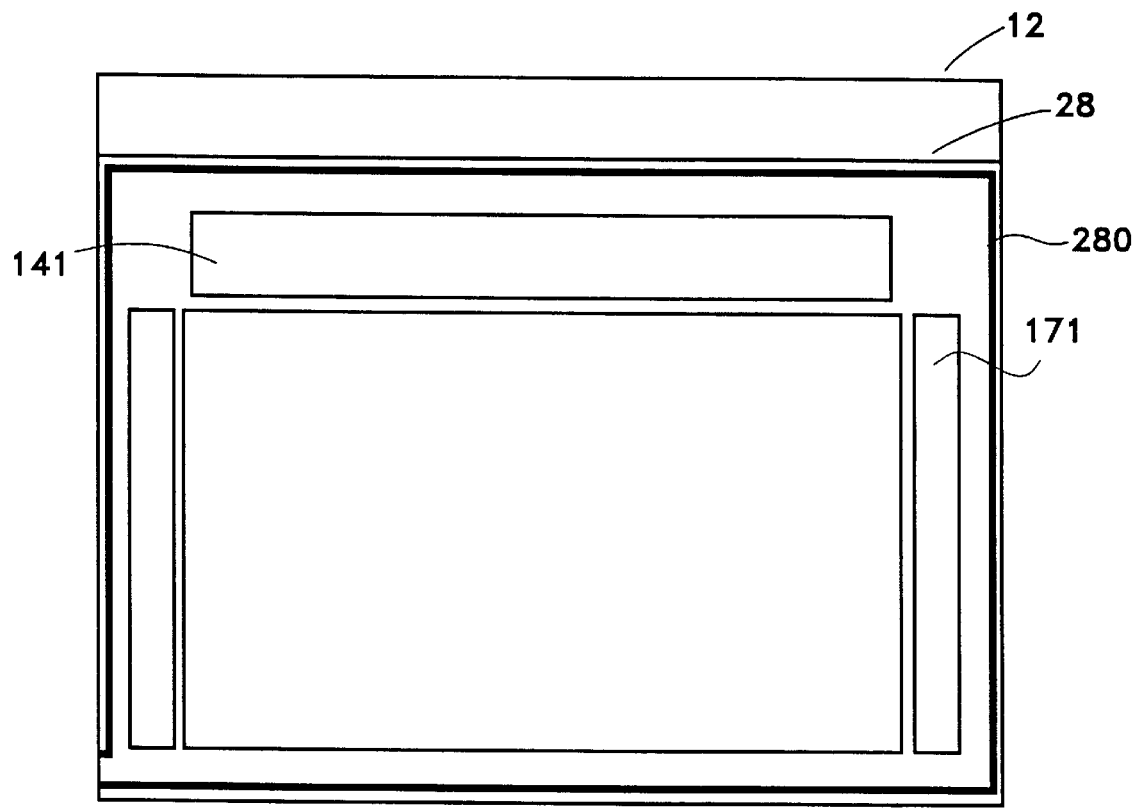
FIG. 3 is a schematic plan view of the liquid crystal display device.

Embodiments of the present invention will be explained hereinafter with reference to the drawings. FIG. 1 is a schematic plan view to explain a lay-out of a polysilicon layer of a semiconductor region 150 and wiring arrangements formed on an array substrate 12 of a liquid crystal display device 10 of the invention. A plurality of signal lines 14 are disposed on the array substrate 12 as parallel, electrically conductive lines in the form of stripes. FIGS. 2(a) and 2(b) are schematic side views taken from lines A-A' and B-B'-B, respectively. In the array substrate 12 of the liquid crystal display device 10, a video signal voltage provided to each pixel is supplied to a source contact 16 of a polysilicon thin film transistor 15 for pixel-switching (called hereinafter "a p-Si TFT") through the signal lines 14. The p-Si TFT 15 has source and drain electrodes 16 and 19 at the ends of a polysilicon semiconductor layer 130, respectively. A gate 13 is disposed on the middle of the semiconductor through a gate insulator 23. A channel region 130 is formed under the gate 13. The TFT 15 controls the channel region 130 in response to a voltage supplied to the gate 13. The TFT 15, thus, functions as a switching element. The p-Si TFT is connected to a scanning line 17 at the gate 13 under which the channel region 130 is formed so as to perform switching of the video signal voltage. The p-Si TFT 15 forms a storage capacitor portion 18A with a storage capacitor line 18 on the side of its drain region to hold the video signal voltage for a fixed period of time. The p-Si TFT 15 is connected to a pixel electrode 20 at its drain electrode through a drain contact 19 to supply the video signal voltage to a liquid crystal layer 22 for each pixel. The storage capacitor line 18 divides the pixel electrode 20 into first and second regions 201 and 202. Since the second region 202 is an aperture, it is desirable to make it larger than the first region 201. As shown in FIG. 3, scanning line and signal line driving circuits 171 and 141 are formed in the display device periphery.

A production process of this liquid crystal display device is next described with reference to FIGS. 2(a) and 2(b).

First, an approximately 500 Å thick amorphous silicon film is formed on a glass substrate 11 with a plasma enhanced chemical vapor deposition ("PECVD") method. After dehydrogenation, the film is made into a polysilicon film with a laser-annealing method and an island-like configuration is made thereon through a patterning process. An approximately 1,000 Å thick gate insulation layer 23 is deposited with the PECVD method. A 4,000 thick molybdenum tungsten (MoW) alloy is deposited on the gate insulation layer with a sputtering method and is shaped into the TFT gate electrode and the scanning lines 17 through a patterning process. An impurity material is doped into the polysilicon film with a self-alignment method. The storage capacitor lines 18 are formed. A first laminating insulation layer 24 made of silicon oxide is deposited up to approximately 5,000 Å thick. After contact holes are made at the source and drain regions, respectively, and the signal lines 14 and drain electrodes 19 are made of 6,000 Å thick molybdenum /aluminum /molybdenum (Mo/Al/Mo) multilayers.

The pixel switching TFTs 15 are n-channel type transistors but driver circuits 141 and 171 shown in FIG. 3 are formed with the structure of n-channel and p-channel complimentary metal oxide semiconductor (CMOS). The impurity doping process to the source/drain regions of the driver circuits is separately carried out for n-channel and p-channel. The TFT 15 includes an n⁻ region so that it can be formed with a light doped drain (LDD) structure.

As a second laminating insulation layer 25, an approximately 5000 Å silicon nitride is formed on the first insulation layer 24. A third laminating insulation layer 26 of about 2 μm thick acrylic resin is further formed on the second insulation layer 25 to make the surfaces of the pixel and the driver circuits smooth. For that purpose, the thickness of the insulation layer ranges preferably from 1 μm to 6 μm. A contact hole is made between the laminating insulation layers 25 and 26 and a pixel electrode 20 is formed on the inner wall of the contact hole. Since the third laminating insulation layer 26 is used for the surface smoothing purpose, it may be made of other organic materials than acrylic resin or inorganic materials, e.g., spin-on glass (SOG) that achieves the purpose. It also may be a composite laminating layer of inorganic and organic materials. Although a photosensitive organic material is better for shortening processes, a non-photosensitive organic material may be used for the third insulation layer.

An array substrate 12 is made in accordance with such methods and processes as set forth above. An alignment layer 121 made of polyimide, for instance, is formed on the array substrate 12 and the alignment process is performed therefor. Opposite to the array substrate 12, a counter substrate 28 is provided. As shown in FIG. 3, a sealing material 280 is coated along the periphery of the substrates and it puts them together tightly after hardening. A liquid crystal material is then pumped into a display panel through an inlet provided at the sealing periphery with a decompressed injection method. After closing the inlet with a confining material, a liquid crystal display device 1 is produced.

As shown in FIGS. 1 and 2, the pixel TFT 15 is formed under the signal line 14 which width is wide enough to shield incident light from reaching the vicinity of the gate electrode of the pixel TFT 15. As a result, it is avoidable to increase a leakage current of the TFT 15 due to light irradiation.

The drain region of the TFT 15 extends in the signal line direction, has a crank-like configuration, and terminates at the drain electrode 19 located at the upper area of the pixel shown in FIG. 1. This long drain region composes a storage capacitor together with the storage capacitor line 18 through the insulation layer identical to the gate insulation layer 23. The storage capacitor 18A is defined in that way so that it can be provided with a sufficiently large capacitance.

As shown in FIG. 1, the drain electrode 19 and storage capacitor 18 at the n-th row are disposed at the upper area of the n-th row pixel. The disposition does not make any protruded light blocking portion in the aperture of the pixel unlike a conventional display device and the aperture has a uniform configuration. In the case, therefore, that the display panel is built in combination with the HOE, the aperture can receive efficiently components of the R, G and B colors from the optical spectrum and the color purity thereof is significantly improved.

As shown in FIG. 1, the pixel electrode 20 is partly overlapped with the storage capacitor line 18, the signal line 14, and the scanning line 17 through the insulation layers 25 and 26 from a plan view. With the structure, the signal voltage can be provided to all the liquid crystals which are not optically blocked. In other words, it is quite effective to enlarge the aperture ratio.

Further, since the lines on the array substrate 12 of the pixel TFT 15 function as light blocking members, the display device has certain advantages even in the case that no light blocking layer is formed on the counter substrate 28. Namely, in the conventional liquid crystal display device, the light blocking layer must be provided on either the array substrate or the counter substrate to prevent light from leaking through the gap defined between the scanning line and the storage capacitor line, and the gap defined between either one of them and either one of the signal line and the pixel electrode. The liquid crystal display device without any additional light blocking layer of the present invention, however, can provide substantially the same effect as in the conventional display device with the additional light blocking layers. In assembling the conventional liquid crystal display cell, the lack of positioning accuracy of the light blocking layers results in decrease of the aperture ratio but such a problem does not exist in the case of the liquid crystal display cell of the present invention. Needless to say, however, much better light blocking effects are obtained if the liquid crystal display device of this invention is provided with the light blocking layers.

The pixel (R, G and B colors consist of three pixels) of FIG. 1 is 78 μm long by 26 μm wide. The aperture ratio can be as large as 43% in even such a fine pixel according to the present invention. The inventors have found that the storage capacitor extending in the longitudinal direction has a sufficiently large capacitance and that this invention is particularly effective in such a narrow pixel as set forth above.

Figure 4:
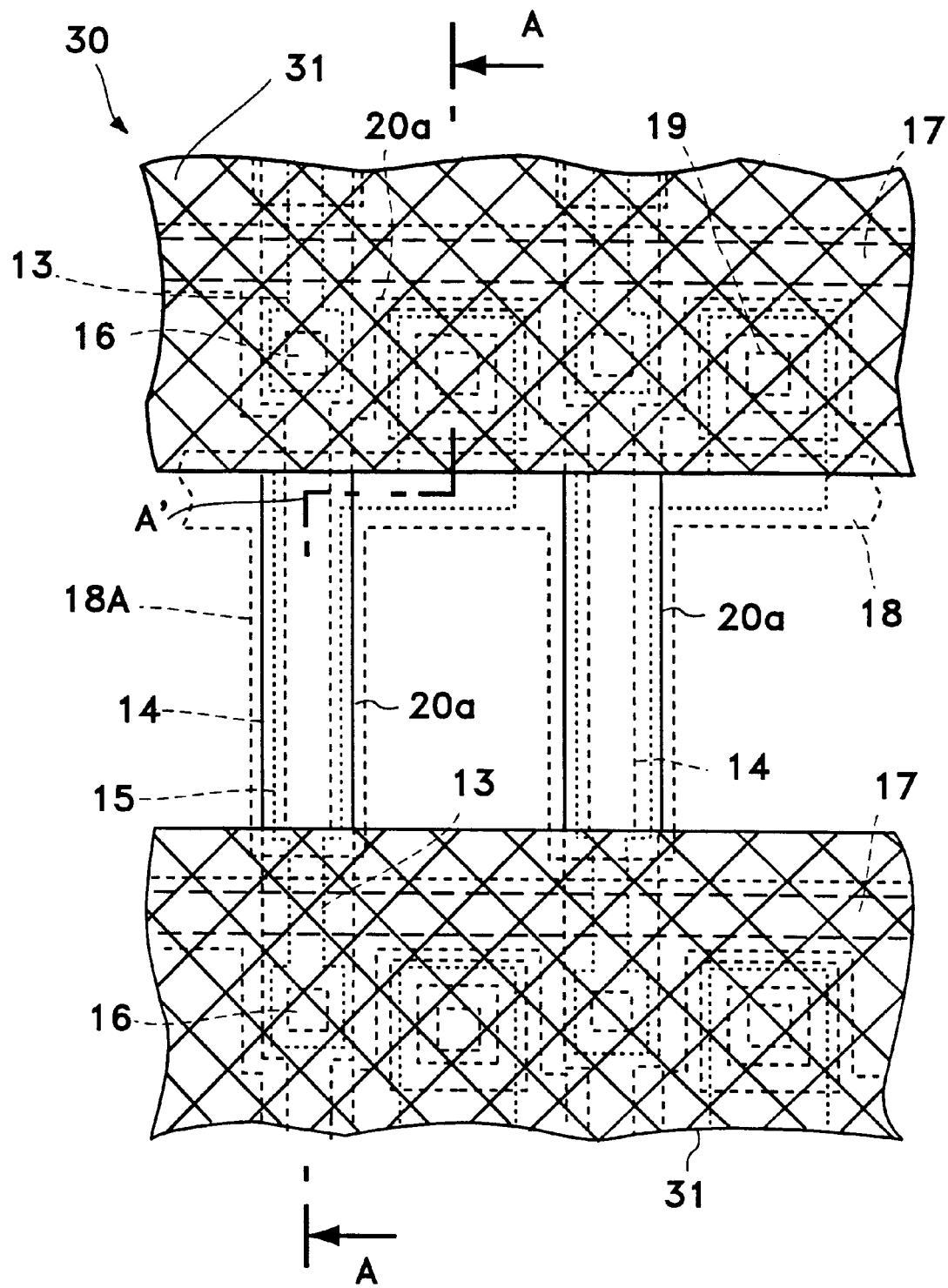
FIG. 4 is a schematic plan view of a liquid crystal display device in accordance with a second embodiment of the present invention.
Figure 5:
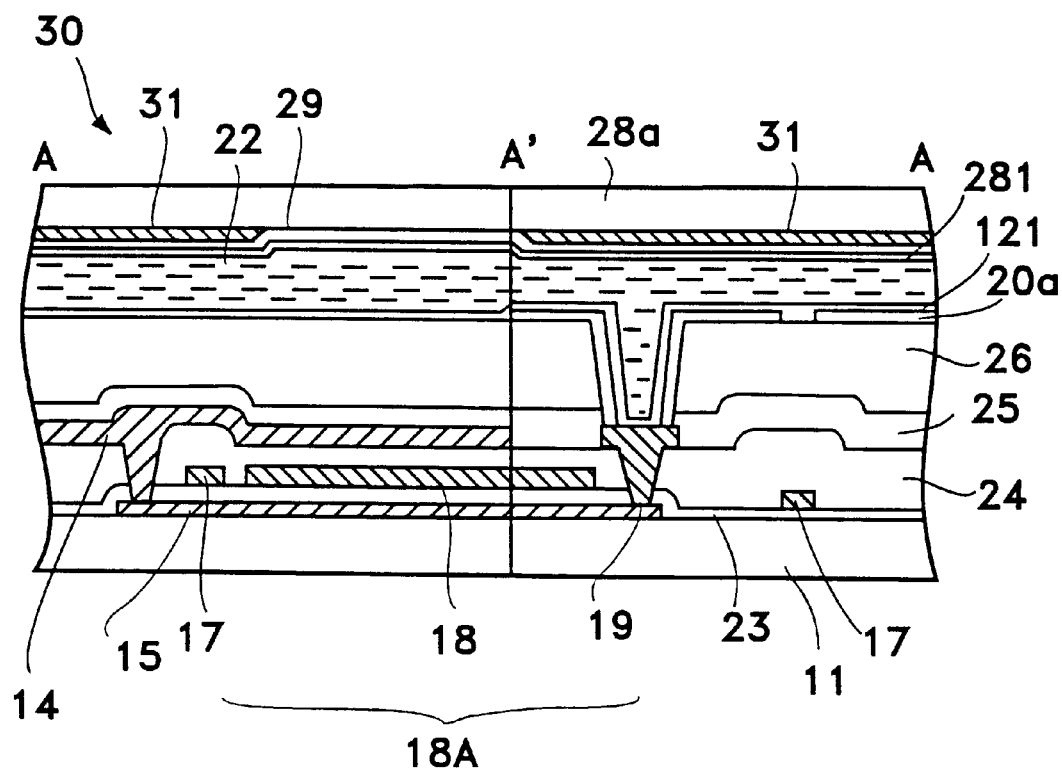
FIG. 5 is a schematic side view taken along A-A'-A line of FIG. 4.

A second embodiment of the liquid crystal display device of the invention will be explained hereinafter. FIG. 4 is a schematic plan view of the liquid crystal display device. FIG. 5 is a schematic side view of the display device taken from A-A'-A line of FIG. 4. In those drawings, substantially the same members as in FIG. 1 have the same reference numerals and the explanation thereof are omitted for the sake of simplicity.

The liquid crystal display device 30 shown in FIGS. 4 and 5 has the region of a pixel electrode 20a which is smaller than that of the pixel electrode shown in FIG. 1. As shown in FIG. 4, a part of the pixel electrode 20a is not overlapped with either one of the scanning line 17 or the signal line 14 from a plan view. As also shown in FIG. 4, the signal voltage is, therefore, not supplied to the liquid crystal at the gaps defined between the pixel electrode 20a and the scanning and signal lines 17 and 14 from a plan view as shown in FIG. 4 and it is necessary to provide them with light blocking layers. This is why a light blocking layer 31 is formed on the counter electrode 28a.

If the pixel electrode 20a is made smaller and its overlapping area with the signal line 14 is reduced as shown, such a structure can provide an advantage to reduce a coupling capacitor due to the overlapping area. Further, since indium tin oxide (ITO) is ordinarily used for a material of the pixel electrode 20a and it is difficult to apply accurate dry etching to the ITO, wet etching is primarily available to process it. If the pixel electrode, however, is made small in size as in this case, its process margin can be eventually improved. In the event that the light blocking layer 31 formed on the counter electrode prescribes in the upper and lower directions, the aperture ratio reduction caused by the positioning error is small in the narrow, less width pixel.

Figure 6:
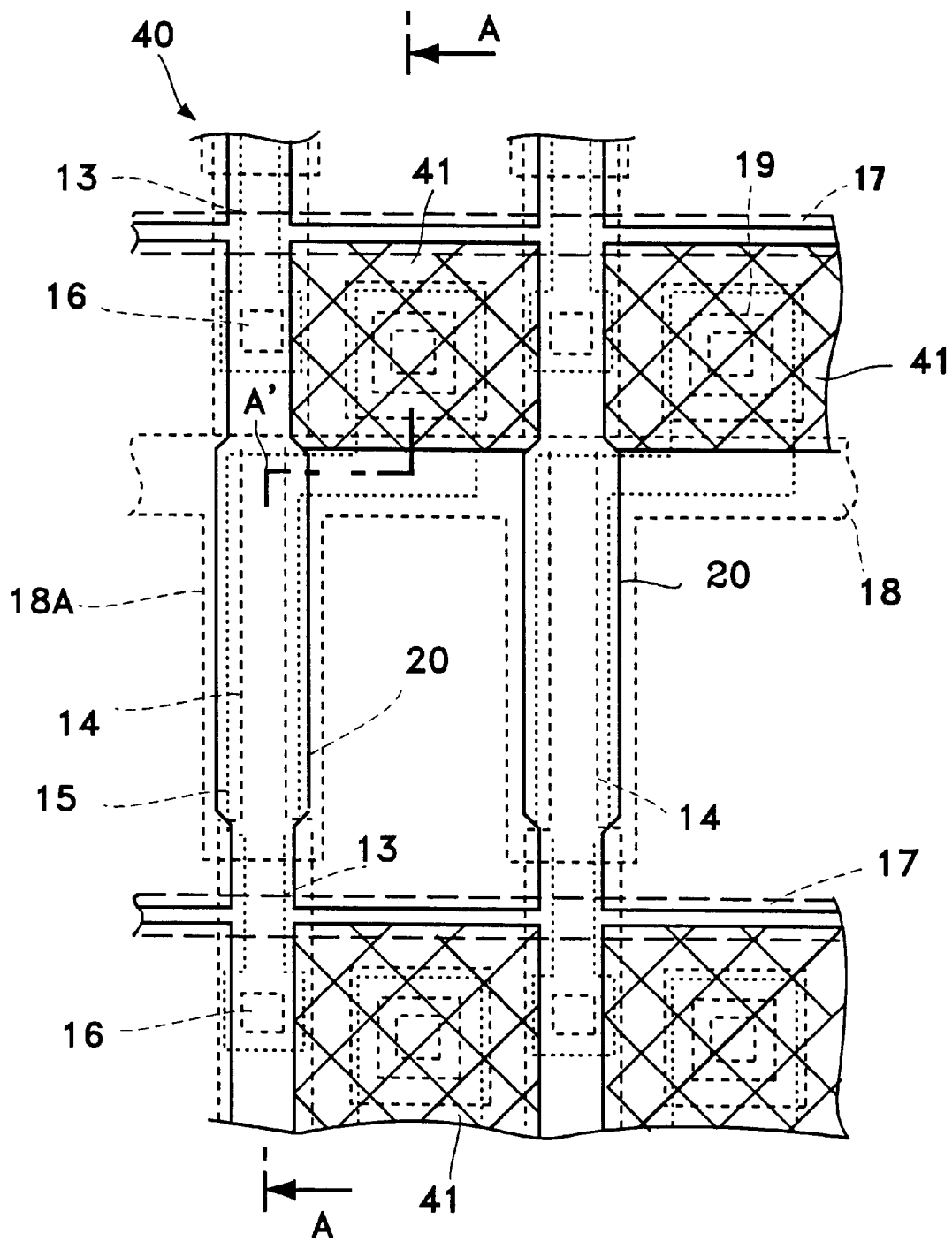
FIG. 6 is a schematic plan view of a liquid crystal display device in accordance with a third embodiment of the present invention.
Figure 7:
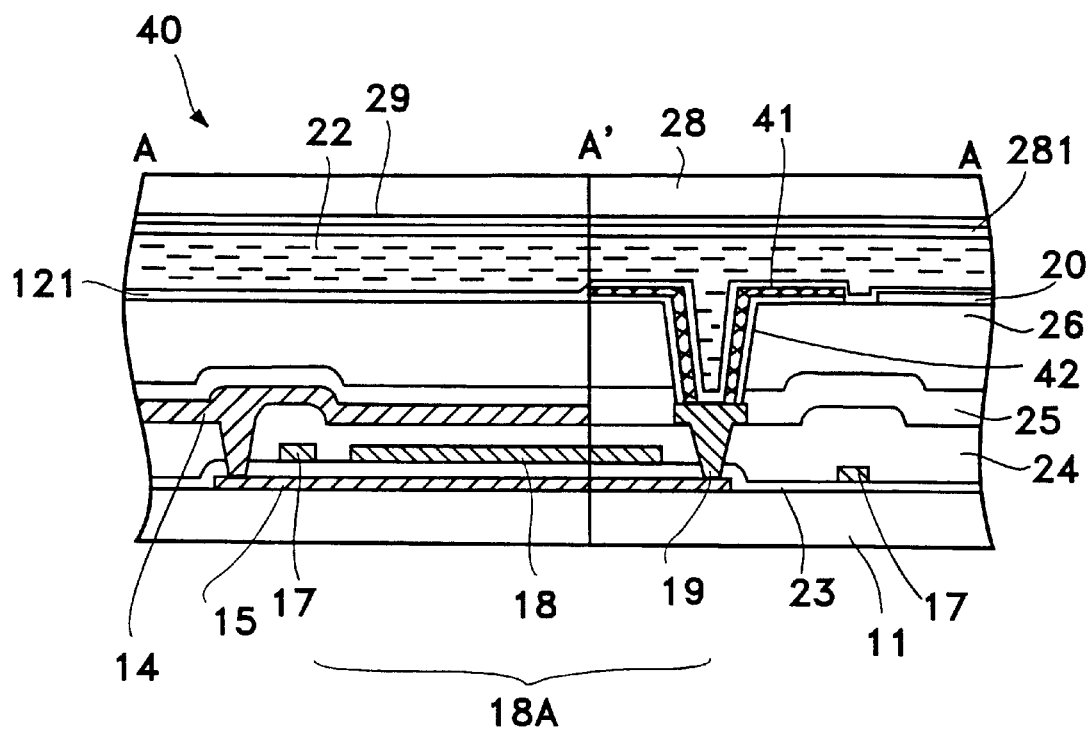
FIG. 7 is a schematic side view taken along A-A'-A line of FIG. 6.

A third embodiment of the liquid crystal display device of the invention will be described hereinafter. FIG. 6 shows schematic plan view of the third embodiment. FIG. 7 is a schematic side view of the third embodiment taken from A-A'-A line of FIG. 6. In the drawings, substantially the same members or components as in FIGS. 1 and 2 have the same reference numeral and the explanation thereof is omitted.

The liquid crystal display device 40 shown in FIGS. 6 and 7, which is different from the display device 10 shown in FIG. 1, includes a light blocking layer 41 formed to cover at least a part of the pixel electrode 20 in the region between the scanning line 17 and the storage capacitor 18. Namely, the light blocking layer 41 is formed on the n-th row pixel to cover the (n−1)th row scanning line 17 and the n-th row the storage capacitor 18. The light blocking layer may be made of organic or inorganic materials. The organic materials are black resist resin or the like while the inorganic materials are metals, e.g., Mo, Ti, MoSi, and Wsi.

As shown in FIG. 6, the signal line 14 and the light blocking layer 41 cover the upper part aperture in the pixel so that the aperture becomes substantially square in configuration. Meanwhile, in the case of the projection type display with the micro-lens array on the pixels, since light are incident on the pixels corresponding to the R, G and B colors, the light utilization efficiency is greater as the aperture configuration becomes more circular. In the modification shown in FIG. 6, the effective aperture becomes square in configuration, i.e., more circular than the original narrow aperture and the light utilization efficiency becomes higher. Further, since the aperture is surrounded with the light blocking members, an additional advantage is that the R, G and B colors become much clearer.

In the case that the laminating insulation layers 25 and 26 are thick, a bad electrical contact or a break of the pixel electrode 20 often takes place at a contact hole 41. If the light blocking layer 41 made of an electrically conductive material such as metal is laminated, such a bad contact or a break can be avoided. A material and the thickness of the light blocking layer is carefully selected to make its transparency preferably 0.1% or less.

Figure 8:
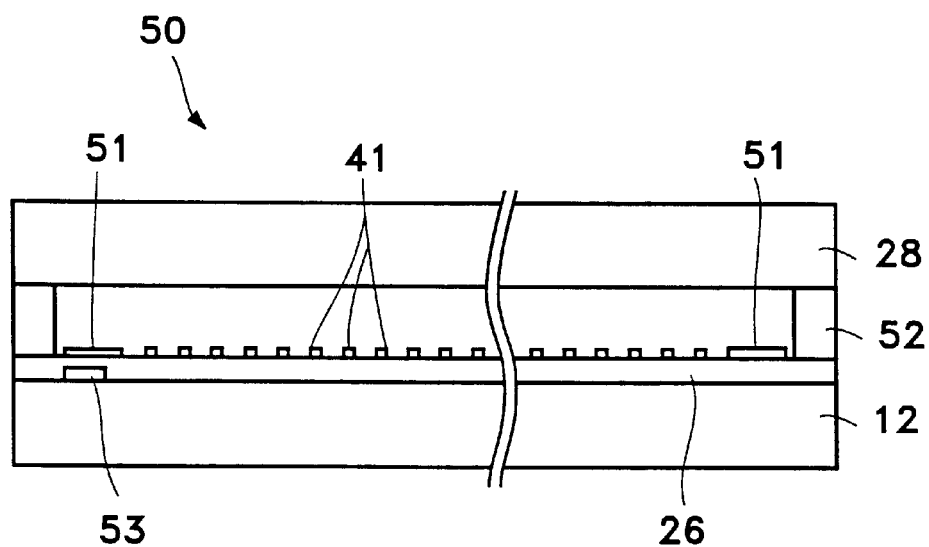
FIG. 8 is a schematic sectional view of a liquid crystal display device in accordance with a fourth embodiment of the invention.
Figure 9:
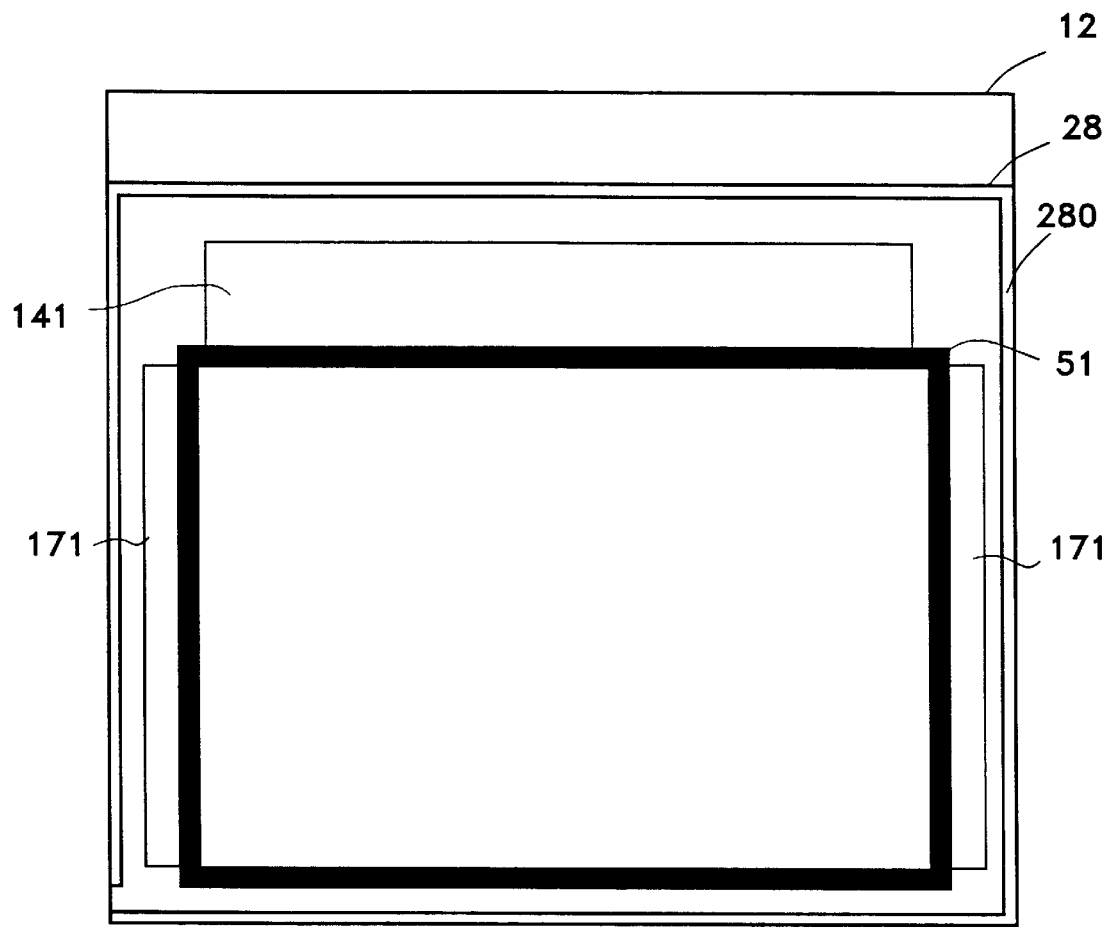
FIG. 9 is a schematic plan view of the display device shown in FIG. 8.

A fourth embodiment of the liquid crystal display device of the invention will be explained hereinafter. FIG. 8 is a schematic side view of the fourth embodiment of the liquid crystal display device. FIG. 9 is a schematic plan view of the display device shown in FIG. 8.

The liquid crystal display device 50 has light blocking layers 41 formed not only at the display region but also those 51 at the peripheral portion. In detail, the light blocking layers 41 are provided for the pixels of the display region where switching elements are disposed in the same manner as shown in FIG. 6. Additional light blocking layers 51 are provided on the driving circuits connected to the signal lines and the scanning lines through a surface smoothing layer at the periphery enclosing the display region on the array substrate 12. With this structure, it is unnecessary to provide a light blocking layer on the counter electrode substrate 28 and, also, unnecessary to consider the positioning accuracy with the counter substrate. If the light blocking layer 51 at the panel periphery out of the display region is made of an electrically conductive material, it achieves not only the light blocking but also an electrical shielding effect. In this case, the potential of the light blocking layer 51 is made the same as that of the counter electrode of the counter substrate 28, the storage capacitor electrode 18, or the ground, it is advantageous for the light blocking layer to function as an electrically shielding layer.

Figure 10:
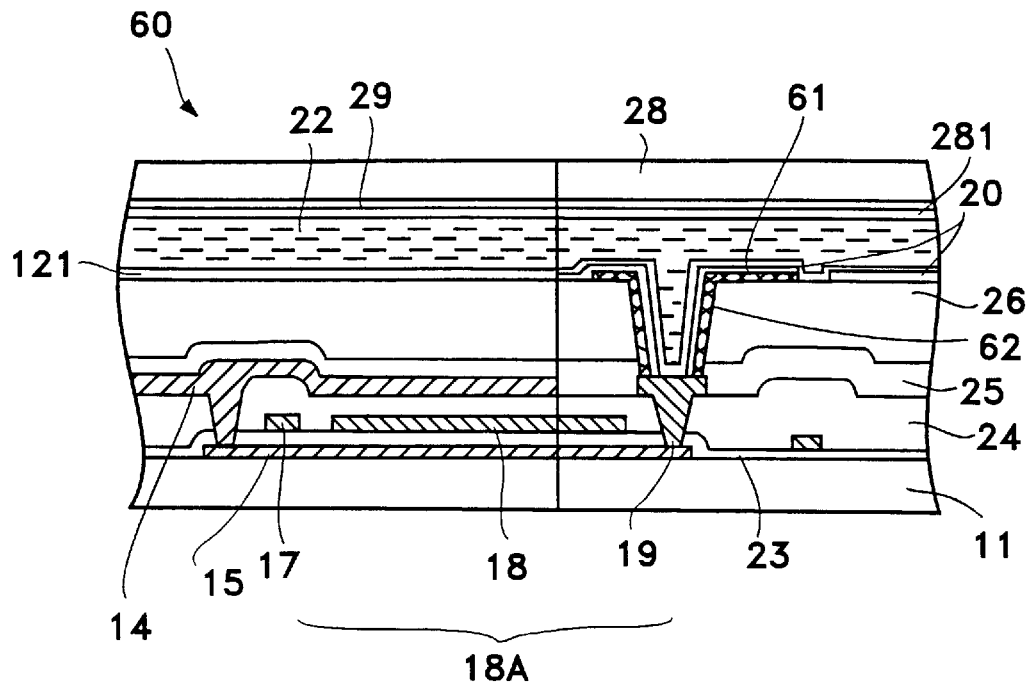
FIG. 10 is a schematic plan view of a liquid crystal display device in accordance with a fifth embodiment of the present invention.

A fifth embodiment of the liquid crystal display device of the invention will be explained hereinafter. FIG. 10 is a schematic side view of the liquid crystal display device. It corresponds to the side view taken from B-B'-B in FIG. 1, and also to FIG. 2(a), 5 or 7. In the event that the components shown in FIG. 10 includes substantially the same as those shown in FIG. 1 or 2(a), the same reference numerals are put thereon and the explanation thereof is omitted.

The display device 60 shown in FIG. 10 is different in structure from the display device 40 shown in FIGS. 6 and 7 as to the laminating order between the pixel electrode and the light blocking layer. In the former, the light blocking layer 61 is disposed between the drain electrode 19 and the pixel electrode 20. The light blocking layer 61 formed in that way and made of an electrically conductive metal layer or the like overcomes such a problem as a bad electrical connection or a break of the pixel electrode at the contact hole 62 in the case of the thick laminating insulation layers 26 and 25.

The light blocking layer 61 may be formed at the periphery out of the display region as in the display device 50 of FIGS. 8 and 9. If the light blocking layer 61 formed at the periphery of the display region is made of an electrically conductive layer, it performing the light blocking as well as the electrical shielding. That is to say, since the potential of the light blocking layer 61 is made equal to that of the counter electrode of the counter substrate 28, the storage capacitor electrode 18 or the ground, the light blocking layer 61 advantageously functions as the electrically shielding member.

Figure 11:
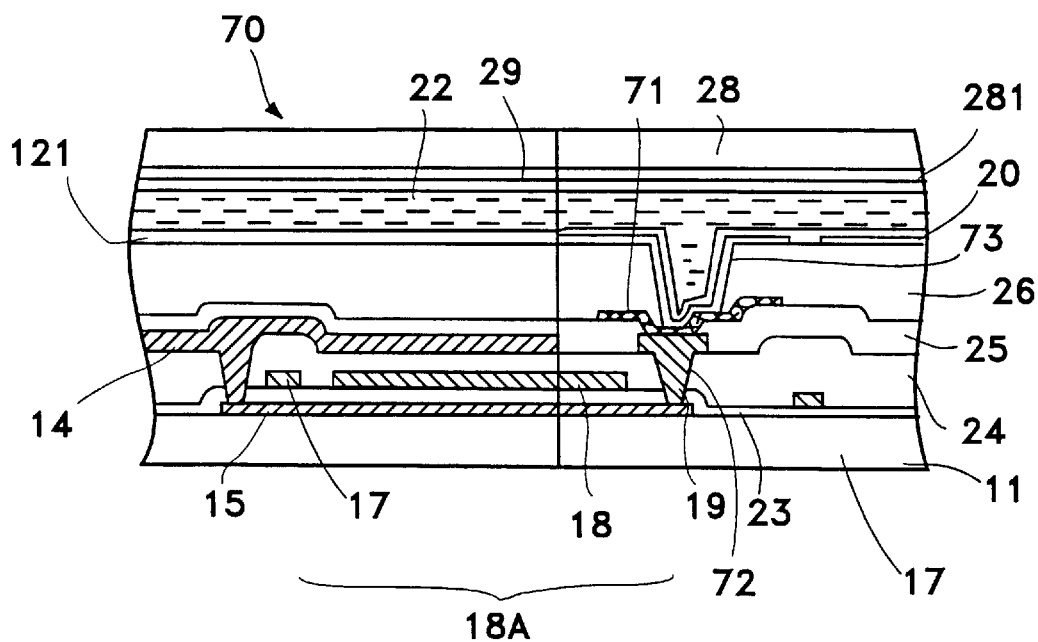
FIG. 11 is a schematic plan view of a liquid crystal display device in accordance with a sixth embodiment of the present invention.

A sixth embodiment of the liquid crystal display device will be described hereinafter. FIG. 11 is a schematic side view of the display device. It corresponds to the side view of FIG. 1 taken from the line B-B'-B, for example, and also to FIG. 2(a), 5, 7, or 10. In the event that the components shown in FIG. 11 are substantially the same as in FIG. 1 or 2, the same reference numerals are put thereon and the explanation thereof is omitted.

In the liquid crystal display device 70 shown in FIG. 11, a light blocking layer 71 is formed on the second insulation layer 25 and the drain electrode 19. It is made of an electrically conductive material such as metal or the like. The connection between the light blocking layer 71 and the pixel electrode 20 may be completed at the same location as that between the drain electrode 19 and the contact hole 72. As shown in FIG. 9, however, the contact between the light blocking layer 71 and the pixel electrode 20 is slightly shifted from the drain electrode 19 in the contact hole 72 so to make the contact hole 73 bigger.

This shift of the contact holes 72 and 73 avoids a bad electrical contact of the pixel electrode 20 often caused by overlapped contact holes. In addition, if a plurality of contact holes or a larger diameter contact hole may be made to connect the light blocking layer 71 and the pixel electrode 20, it brings about an advantage to reduce a bad electrical connection with the pixel electrode 20.

The structure set forth above can reduce an insufficient alignment of the liquid crystal molecular caused by the uneven surface of the array substrate. As shown in FIGS. 7 and 10, in the case of lamination of the light blocking layer and the pixel electrode 20, there is a step which height is equal to the thickness thereof at the edge portion of the pixel electrode 20 on the surface of the third laminating insulation layer 26. Because of such a step, an improper molecular alignment sometimes occurs at shadow portions of the step when an alignment process is applied to alignment layers 121 and 281. The structure shown in FIG. 11, however, does not have such a big step because the light blocking layer 71 is not laminated with the pixel electrode 20 on the surface of the third insulation layer 26. It does not increase the improper alignment but rather provides a desirable effect from the alignment view point.

Figure 12:
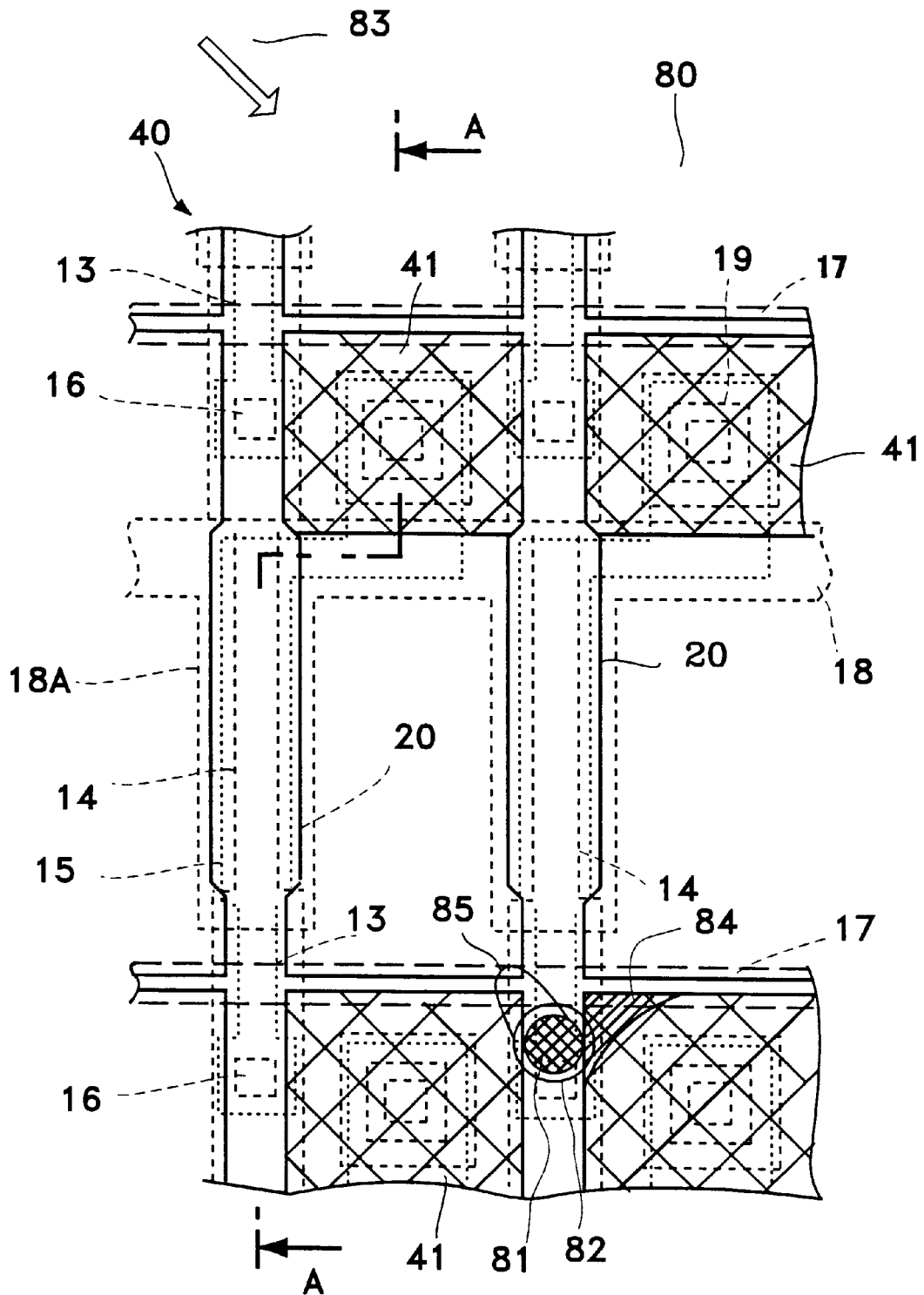
FIG. 12 is a schematic plan view of a liquid crystal display device in accordance with a seventh embodiment of the present invention.
Figure 13:
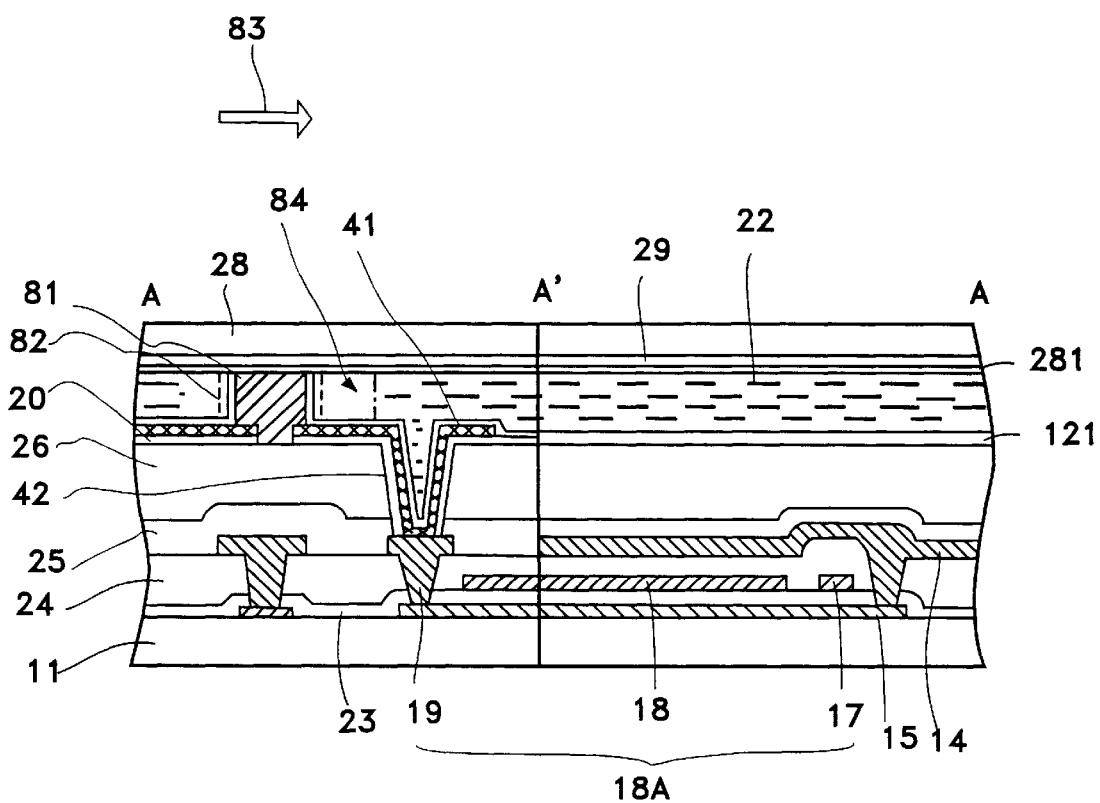
FIG. 13 is a schematic side view taken along A-A'-A line of FIG. 12.

A seventh embodiment of the liquid crystal display device of the invention will be explained hereinafter. FIG. 12 is a schematic plan view of the seventh embodiment. FIG. 13 is a schematic side view cut along and taken from A-A'-A line of FIG. 12. In the event that components are substantially the same as in FIG. 1 or 2, they have the same reference numerals and the explanation thereof is omitted.

Figure 16:
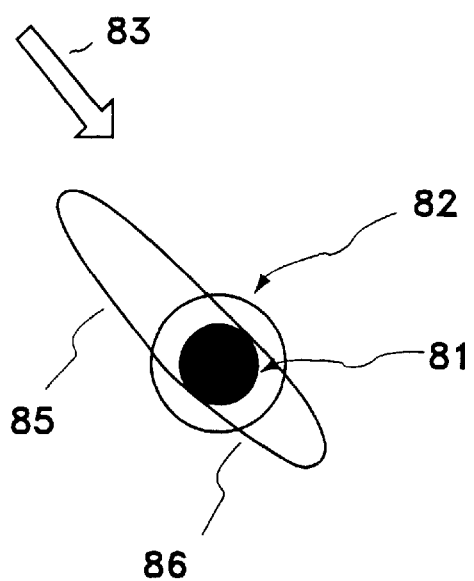
FIG. 16 is a schematic explanatory diagram of improper liquid crystal alignment.
Figure 17:
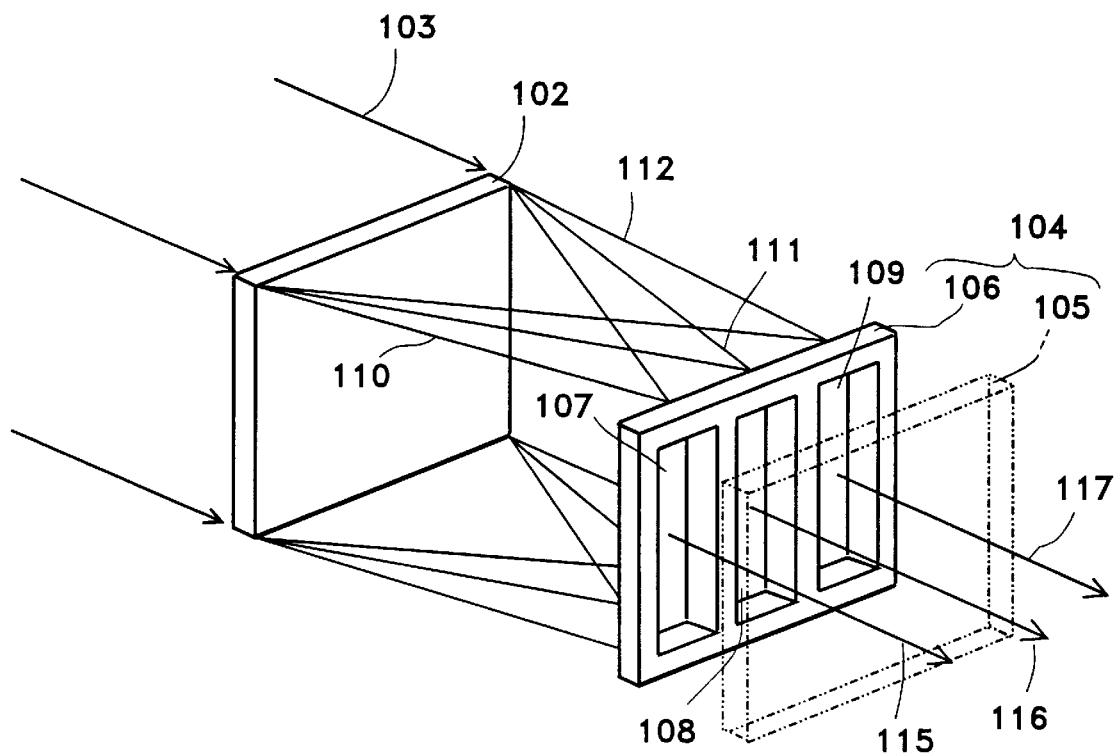
FIG. 17 is a schematic perspective view of a hologram optical element.
Figure 18:
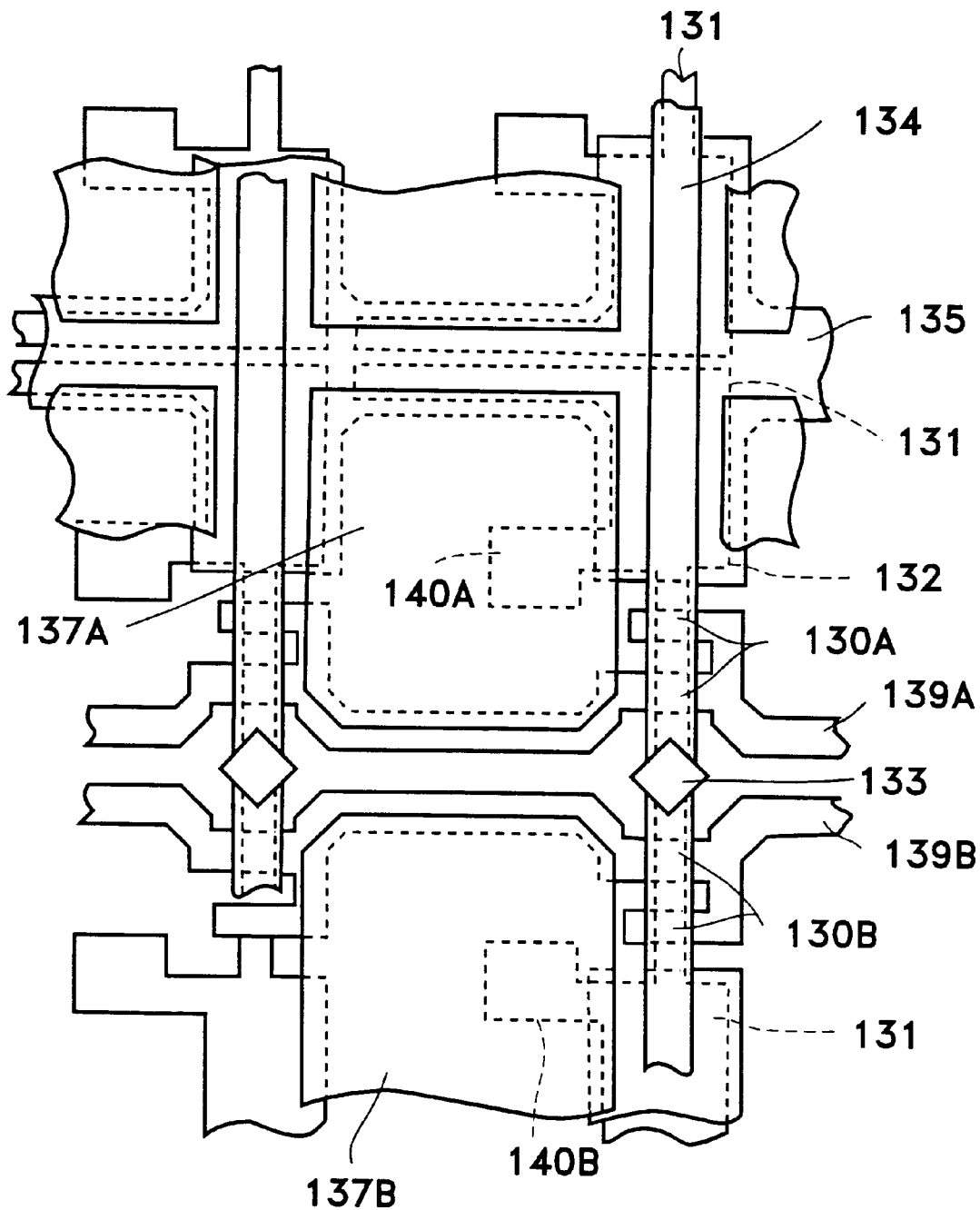
FIG. 18 is a schematic plan view of a conventional liquid crystal display device.

In the liquid crystal display device 80 shown in FIGS. 12 and 13, a spacer column 81 to control a gap of the cell is formed in the vicinity of the gate electrode of the pixel TFT on the array substrate. This spacer column 81 may be made of a transparent or opacity organic material after the pixel electrode has been formed. In this embodiment, an organic material containing an acrylic resin as the principal ingredient is used to form the spacer column. If a photosensitive material is used for the spacer column, it is effective to shorten its processes. It is more desirable to use a negative type photosensitive material for the spacer column than a positive type one because the former is not affected too much by dusts in the forming process. After the spacer column has been formed on the array substrate and the alignment layer 121 has been coated, an alignment process is carried out in accordance with the rubbing method. If the spacer column is relatively higher in height or larger in size, an insufficient alignment easily takes place at the upper and lower ends of the rubbing direction. FIG. 16 is a schematic explanatory diagram of an insufficient or improper liquid crystal alignment regions observed in the vicinity of the spacer column of each liquid crystal display cell. As in the previous embodiment, the array and counter glass substrates, and the liquid crystal contained therebetween are assembled into the liquid crystal display cell. The array glass substrate includes the sufficiently large ITO electrodes formed thereon, and the spacer columns, the principal ingredient of which consists of an acrylic resin material while the counter glass substrate also includes the sufficiently large ITO counter electrodes. The improper alignment in the vicinity of the spacer column 81 is observed when an operation voltage is applied between the ITO electrodes. The inventors have observed improper liquid crystal alignment regions 82, 85 and 86. The region 82 has been 2–4 $\mu$m wide in circumference around the center of the spacer column 81. The regions 85 and 86 have been 5–20 $\mu$m long in the front and the rear of the spacer column along the rubbing direction 83, respectively.

In the region 82, the liquid crystal alignment is so disturbed that the optical transmittance characteristic of the region 82 does not depend on, nor is well controllable with, the voltage applied between the ITO electrodes on the array and counter substrates and that almost all the incident light passes through the liquid crystal even in black mode operation. The optical transmittance characteristics of the regions 85 and 86 appear to be slightly different from that in regions sufficiently far from the spacer column (ordinary alignment regions). The inventors' evaluation, however, has revealed that the transmittance characteristics in the former have fluctuations which are equal to or less than 10% of those in the latter.

In the event that the spacer column 81 is practically disposed on the pixel of the array substrate, as shown in FIGS. 12 and 13, the improper alignment region 82 is located at the surrounding of the column 81, the region 85 is in the rear thereof in the rubbing direction, and another improper alignment region 84 is caused by the region 82 at a neighboring area of the surrounding where a sufficient voltage is not applied. The region 84 is located in the front of the spacer column 81 in the rubbing direction because the liquid crystal subject to the alignment is not uniform there. As in the region 82, the optical transmittance characteristic of the region 84 does not depend on, nor is well controllable with, a voltage applied to the ITO electrodes on the array and counter substrates.

As shown in FIGS. 12 and 13, the liquid crystal display panel of this embodiment has the improper liquid crystal alignment region 82 in the surrounding of the spacer column 81, the improper alignment region 85 in the rear of the column 81 in the rubbing direction 83, and the improper alignment region at the edge of the pixel electrode 20 in the front of the column in the rubbing direction 83. In this embodiment, the regions 82 and 84 are optically shielded because the transmittance characteristics thereof are not well controllable and are always in white mode operation. Since the region 85 is not so poor in optical transmittance characteristic as those 82 and 84, the optical shield is not necessarily provided for the region 85 but, needless to say, it is preferable to optically shield it, if possible.

Further, if the improper alignment regions are made substantially small in area in comparison with the pixel aperture, the display device serves the purpose without completely optical shields. The spacer column 81, however, must be provided in a light shielding area because the improper liquid crystal alignment is produces in the surrounding 82 around the spacer column 81. As shown in FIG.

12, the spacer column 81 is provided, by way of example, in an area optically shielded with the signal line 14 but close to the gate 13 of the TFT. In terms of the number of the spacer column of this sort, one spacer column is provided for approximately 6 through 9 pixels although it depends on pixel size. FIG. 12 shows only one spacer column in the drawing.

In the case of the projector application, a wide viewing angle characteristic is not so demanded as in the direct display. A fast response projector, however, is required for display of moving images. In the highly fine pixels, a pixel pitch becomes small (pixel density increases) and the aperture ratio thereof, thus, is apt to decrease because of improper alignment regions caused by the increased pixels. A liquid crystal material with large birefringence Δn, therefore, is used to make the liquid crystal display cell thin for the fast response characteristic and preferably attains the same display dignity as of a conventional projector. In the embodiment, the spacer column height is about 3.5 μm which is lower than 5 μm in a conventional TN liquid crystal cell. The birefringence Δn of a liquid crystal material is 0.14. As a result, in the operation temperature from 40° C. to 50° C. of the projector, it achieves 15 ms or less response time taken for the transmittance decrease from 100% to 90%. It is a great improvement in comparison with 50 ms response time of a conventional liquid crystal display cell. In addition, the height of a spacer column can be made lower so that it is easy to form the spacer column. It may also have advantages to prevent the spacer column from breaking, and from causing improper liquid crystal alignment. Such a spacer column is provided for all the liquid crystal display devices shown in FIGS. 1 through 11. The spacer column can be disposed in any location on the array substrate. In consideration of improper liquid crystal alignment produced in the vicinity of the spacer column, however, it is preferable to dispose the column at light blocking members such as the signal lines and the light blocking layers on the array substrate.

In the case that the spacer column is formed in the display cell shown in FIG. 5, if the first region of the pixel electrode 20 is optically shielded with the light blocking layer 31 on the counter electrode 28, much better light leakage prevention can be attained. Further, in this case of FIG. 5, it also brings about another benefit in which an improper liquid crystal alignment region caused by the spacer column is optically shielded with the light blocking layer 31 of the counter electrode 28.

Figure 14:
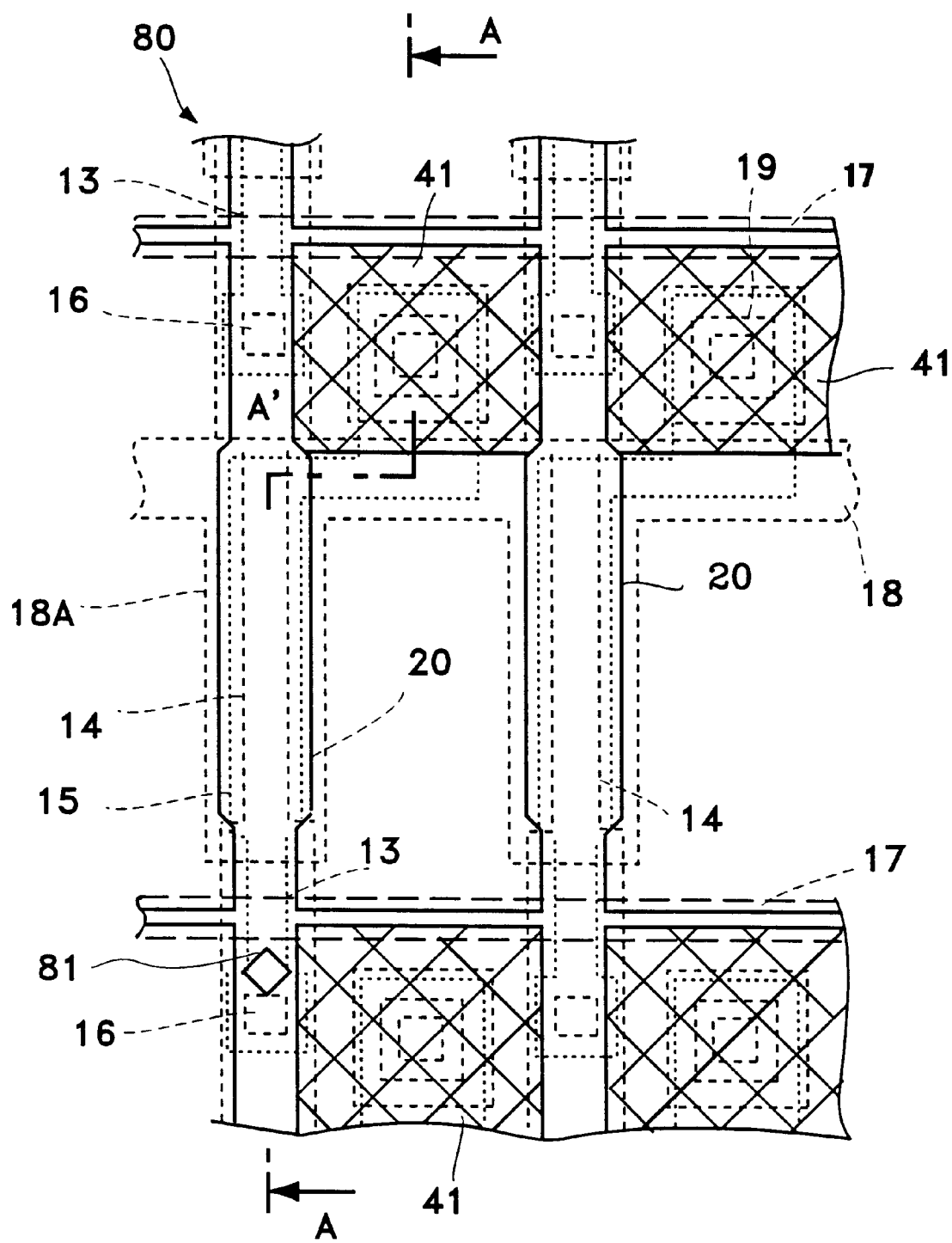
FIG. 14 is a schematic plan view of a liquid crystal display device in accordance with a eighth embodiment of the present invention.
Figure 15:
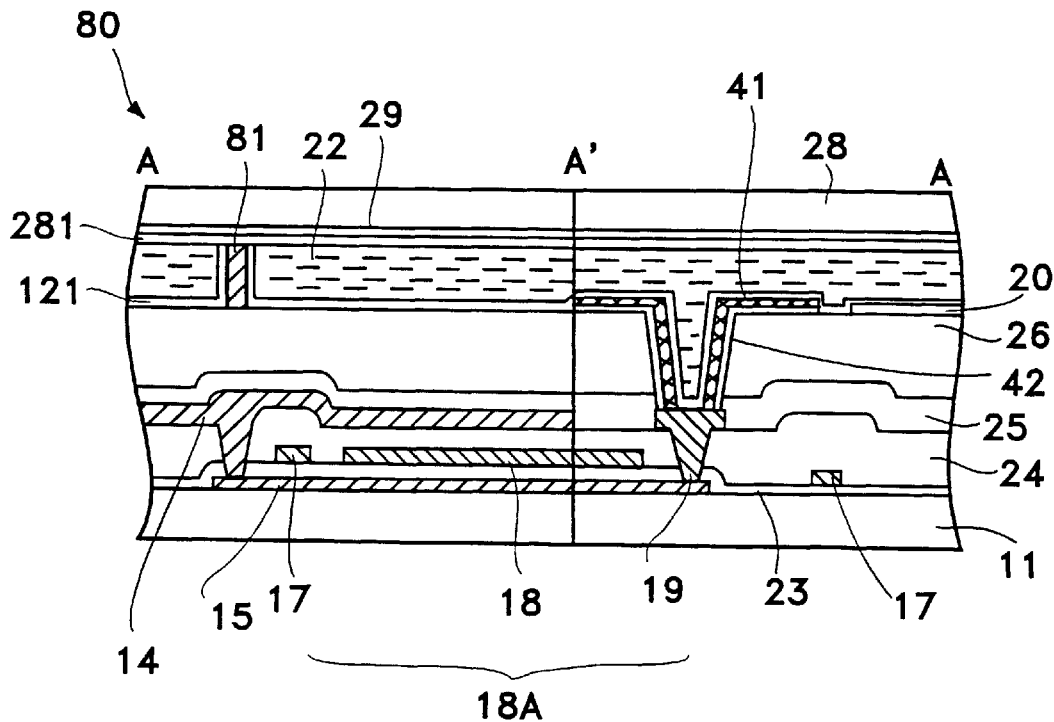
FIG. 15 is a schematic side view taken along A-A'-A line of FIG. 14.

A eighth embodiment of the liquid crystal display device of the invention will be described hereinafter. FIG. 14 is a schematic plan view of this embodiment. FIG. 15 is a schematic sectional view taken along an A-A'-A line of FIG. 14. In the event that components in FIGS. 14 and 15 are substantially the same as of FIG. 1 or 2, the same reference numerals are put thereon and the explanation thereof is omitted.

The liquid crystal display device 80 in FIG. 14 includes the spacer column 81 formed in the vicinity of the gate electrode of the pixel TFT on the array substrate. The spacer column 81 is made of a transparent or opacity organic material, for instance, after the pixel electrode 20 has been formed. If a photosensitive material is used for making the spacer column, it is effective to shorten its process. In this case, a negative type photosensitive material is more suitable for it than positive type one because the former is less affected by dusts in the process.

As described in the seventh embodiment, it is preferable to make the spacer column low in order to decrease liquid crystal improper alignment regions. Since there are overlapped parts between improper rubbing portions of a alignment layer 121 and ones to which a sufficient voltage is not applied, the improper alignment region becomes smaller as the poor rubbing portions of the alignment layer 121 is smaller. In the event that the height of the spacer column 81 is made lower, the poor rubbing region becomes smaller and the liquid crystal improper alignment region also becomes smaller.

The height of the spacer column 81, however, cannot be easily changed. Unless the liquid crystal improper alignment region is confined within the minimum light blocking region, it causes a pixel reduction in the aperture ratio. To this end, the spacer column 81 shown in FIG. 14 has such a configuration that its cross-sectional width of the spacer column in the ordinary TN rubbing direction of 45° with respect to the reference axis is smaller than other cross-sectional width thereof, e.g., its diagonal cross-sectional width. This is merely because of improper liquid crystal alignment forming mechanism. It is quite difficult to apply the rubbing process to some sections located in the front and rear of the spacer column in the rubbing direction when the liquid crystal alignment carried out with rubbing pile. The area of such sections depends on the configuration of the spacer column in the liquid crystal alignment direction. If the spacer column is rotated about the center thereof by 45° from that shown in FIG. 14, for example, and the liquid crystal alignment is performed along the diagonal direction of the rectangular cross-section of the spacer column, the maximum length of improper liquid crystal alignment is approximately $\sqrt{2}$ times as long as the spacer column in FIG. 14. It is in proportion to the cross-sectional length of the spacer column in the alignment processing direction. The plan configuration of the spacer column is not limited to that shown in FIG. 14 but may be any arbitrary one so far as the length of the spacer column in the alignment direction is at the minimum to avoid the reduction of the aperture ratio. In the case that the bottom area of the spacer column with rectangular cross-section, for instance, is large to increase its adhesive strength, no critical improper alignment takes place if the shorter side of the rectangle is consistent with the liquid crystal alignment direction.

The array substrate includes sections where the light blocking layer optically shields and/or the improper liquid crystal alignment easily takes place because of the uneven surface thereof. If the spacer column 81 is provided in the rear of such sections in the alignment direction, the improper alignment region does not increase. It is preferable, however, that the sections are optically shielded. An example thereof is a pixel contact portion. As shown in FIG. 2(b), the pixel contact portion has a deep hollow made on the TFT drain electrode 19 in the array substrate and the improper liquid crystal alignment is easily cause there. This pixel contact portion is optically shielded with the drain electrode 19.

If the spacer column is disposed in such a location that the improper alignment region caused by the spacer column 81 is overlapped with the pixel contact portion, it is unnecessary to form a new light blocking layer. For this purpose, the spacer column 81 is disposed on the signal line in the vicinity of the first region 201 of the pixel electrode where the pixel contact portion exists.

The present invention provides a liquid crystal display device with higher aperture ratio pixels and higher yield at the same time. In short, the liquid crystal display device of the invention can secure a sufficient capacitance of storage capacitors and large spaces defined between the storage capacitors and the scanning lines. It is because the TFT and the storage capacitor are formed in a longitudinal direction, each pixel contact portion is disposed at the upper portion of the n-th row pixel between the storage capacitor and the (n+1) th row scanning line, and the pixel contact portion is not extended to the pixel aperture. With this structure, the higher aperture ratio pixels can be realized. The structure of the present invention is particularly suitable for a one-plate type color liquid crystal display device with the pixel length and breadth ratio of 3:1.

According to the present invention, the pixel TFTs are formed under the signal lines and the signal lines are made wider on the TFTs to optically shield the area adjacent to the electrodes thereof. Since the signal lines optically shield the active layers of the TFTs in this way, the increase of leakage TFT currents due to light irradiation can be avoided.

Further, the liquid crystal display device includes the drain region of the TFTs which extends in the direction of the signal line, makes a crank-like turn and terminates at the drain electrode at the upper portion of the pixel. This long drain region defines the storage capacitor with the storage capacitor line through the insulation layer identical to the gate insulation layer. In such a way that the drain region extends along the longitudinal pixel and defines the storage capacitor, a sufficiently large capacitance of the storage capacitor can be obtained.

According to the present invention, the pixel electrode is overlapped with the storage capacitor line and the signal and scanning lines through the laminating insulation layers on the plan. This is also quite effective to make the aperture ratio large. Furthermore, since wiring to form the pixel TFT on the array substrate, as the case may be, functions as a light blocking layer, it is unnecessary to form a light blocking layer on the counter substrate. As a result, the reduction of the aperture ratio due to the lack of assembling positioning accuracy can be avoided.

In the event that the HOE, the micro-lens array and the like are provided on the incident light side of the light blocking layer formed on the array substrate of the liquid crystal display device, the positioning thereof may be carried out only for the aperture formed on the array substrate and surrounded by light blocking materials and it does not introduce either optical loss or deterioration in chromaticity. In a color display system which does not use color filters but the HOE or the micro-lens array, it is necessary to make the thickness of a counter substrate thinner in terms of the focuses thereof as the pixel pitch is smaller and in higher definition. It is, therefore, difficult to provide the counter substrate with sufficient mechanical strength, to form the liquid crystal cell, and to apply conventional patterning to the light blocking layer on the thin counter substrate. According to the present invention, however, it is unnecessary to form a light blocking layer on the counter substrate as described above. The present invention, thus, provides such an advantageous way that the HOE or the micro-lens array can be put together with the thin counter substrate with the counter electrode, or the array substrate mentioned above can be also put together with the counter electrode made of laminated thin counter substrates to assemble the liquid crystal cell.

According to the embodiments of the present invention, since the improper liquid crystal alignment region caused by the spacer column is formed in the light blocking sections, a bad quality display can be reduced.

This invention can provide a liquid crystal display device in which hologram optical elements, a micro-lens array and the like are easily integrated with each other. Namely, the n-th row pixel drain electrode and storage capacitor are disposed at the upper portion of the n-th pixel so that approximately rectangular, uniform shaped apertures are formed without any projected light blocking member in the pixel aperture as seen in a conventional liquid crystal cell. In the case, therefore, that the liquid crystal display device is combined with the HOE, the aperture effectively receives components of the R, G and B colors only from light spectrum distributions.

In other words, the present invention can provide a liquid crystal display device with the characteristics of a higher aperture ratio, higher speed response, a large capacitance of storage capacitors, and higher yield so that its industrial effects are significant.

What we claim is:

1. A liquid crystal display device comprising:
   an array substrate;
   a counter substrate provided opposite to said array substrate, said counter substrate having counter electrodes;
   a liquid crystal contained between said array and counter substrates;
   scanning lines provided on said array substrate;
   signal lines running across said scanning lines through an insulator;
   switching elements including thin film transistors provided in a matrix form at crossing areas where said scanning lines run across said scanning lines;
   pixel electrodes provided in a matrix form in regions surrounded by said scanning and signal lines, said pixel electrodes being connected to said switching elements; and
   storage capacitor lines disposed in parallel with said scanning lines;
   wherein said storage capacitor lines divide said pixel electrodes into first regions and second regions and define storage capacitors overlapping with and extending along said signal lines,
   wherein each of said thin film transistors includes a semiconductor layer which is overlapped with and extended along said crossing area, an area adjacent thereto and said storage capacitor,
   wherein an end portion of said semiconductor layer is overlapped with said first region of said pixel electrode,
   wherein said semiconductor forms a channel at said crossing area, and includes
      a first contact portion between said signal line and one of said source and drain electrodes at a location in the vicinity of said channel, and
      a second contact portion between said first region and the other one of said source and drain electrodes at said end portion.

2. The liquid crystal display device according to claim 1, wherein said pixel electrode has narrow configuration which longitude is in an extending direction of said signal line, said storage capacitor line divides said pixel electrode into two parts along said extending direction, and said first region of said pixel electrode is smaller than said second region of said pixel electrode.

3. The liquid crystal display device according to claim 2, wherein said first region of said pixel electrode is farther from said channel of said semiconductor than said second region of said pixel electrode.

4. The liquid crystal display device according to claim 1, wherein said scanning line, said storage capacitor line and said storage capacitor are formed with an identical pattern metal layer, and wherein said semiconductor layer, said pattern metal layer, said signal line and said pixel electrode are laminated with each other through insulation layers including said insulator.

5. The liquid crystal display device according to claim 1, wherein at least one of said scanning line, said signal line and said storage capacitor line is made of a light blocking material, and is overlapped with a periphery of said pixel electrode.

6. The liquid crystal display device according to claim 5, wherein said pixel electrode is made of laminated light blocking layers.

7. The liquid crystal display device according to claim 6, wherein said light blocking layer is formed on a first insulation layer different from a second insulation layer on which the pixel electrode is formed, said light blocking layer is further electrically connected to one of said source and drain electrodes and said pixel electrode.

8. The liquid crystal display device according to claim 6, wherein an additional light blocking layer is formed on a peripheral edge portion enclosing a display area on one of said array and counter substrates.

9. The liquid crystal display device according to claim 8, wherein said additional light blocking layer is made of an electrically conductive material and is connected to a fixed potential.

10. The liquid crystal display device according to claim 8, wherein said additional light blocking layer is overlapped through said insulator with a driving circuit which drives at least one of said signal and scanning lines.

11. A liquid crystal display device comprising:

an array substrate;

a counter substrate provided opposite to said array substrate, said counter substrate having counter electrodes;

a liquid crystal contained between said array and counter substrates;

scanning lines provided on said array substrate;

signal lines running across said scanning lines through an insulator;

switching elements including thin film transistors provided in a matrix form at crossing areas where said scanning lines run across said scanning lines;

pixel electrodes provided in a matrix form in regions surround by said scanning and signal lines, said pixel electrodes being connected to said switching elements;

storage capacitor lines disposed in parallel with said scanning lines;

a spacer provided on said array substrate to hold gaps between said array and counter substrates; and alignment layers provided on surfaces of said array and said counter substrates, said surfaces contacting said liquid crystal;

wherein said storage capacitor lines divide said pixel electrodes into first regions and second regions and define storage capacitors overlapping with and extending along said signal lines, wherein each of said thin film transistors includes a semiconductor layer which is overlapped with and extended along said crossing area, an area adjacent thereto and said storage capacitor, wherein an end portion of said semiconductor layer is overlapped with said first region of said pixel electrode, wherein said semiconductor forms a channel at said crossing area, and includes a first contact portion between said signal line and one of said source and drain electrodes at a location in the vicinity of the channel, and a second contact portion between said first region and the other one of said source and drain electrodes at said end portion, wherein said spacer is formed in a column configuration which cross-section is substantially narrow, and wherein said spacer is disposed at a location on said signal line adjacent to said first region of said pixel electrode.

12. The liquid crystal display device according to claim 11, wherein a light blocking layer is formed on said counter substrate opposite to said first region of said pixel electrode.

13. The liquid crystal display device according to claim 11, wherein said alignment layers are processed with rubbing and said cross-section of said spacer is shorter substantially in the direction of said rubbing than in other directions.

14. The liquid crystal display device according to claim 11, a light blocking layer is further provided on said array substrate to shield improper liquid crystal alignment regions caused by said spacer.

15. The liquid crystal display device according to claim 11, a light blocking layer is further provided on said counter substrate to shield improper liquid crystal alignment regions caused by said spacer.

* * * * *